(12) United States Patent
McChesney et al.

(10) Patent No.: US 11,892,096 B2
(45) Date of Patent: Feb. 6, 2024

(54) ADDITIVE MANUFACTURED FLOATS FOR USE IN A DOWNHOLE ENVIRONMENT

(71) Applicant: Halliburton Energy Services, Inc., Houston, TX (US)

(72) Inventors: Ryan W. McChesney, Carrollton, TX (US); Stephen Michael Greci, Carrollton, TX (US); Michael Linley Fripp, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 34 days.

(21) Appl. No.: 17/353,125

(22) Filed: Jun. 21, 2021

(65) Prior Publication Data
US 2022/0403714 A1 Dec. 22, 2022

(51) Int. Cl.
| | | |
|---|---|---|
| *F16K 33/00* | (2006.01) | |
| *E21B 43/34* | (2006.01) | |
| *E21B 43/12* | (2006.01) | |
| *B33Y 80/00* | (2015.01) | |
| *F16K 31/18* | (2006.01) | |
| *E21B 34/06* | (2006.01) | |
| *E21B 34/08* | (2006.01) | |
| *F16K 31/22* | (2006.01) | |
| *B29C 64/00* | (2017.01) | |
| *E21B 43/14* | (2006.01) | |

(52) U.S. Cl.
CPC .............. *F16K 33/00* (2013.01); *B29C 64/00* (2017.08); *B33Y 80/00* (2014.12); *E21B 34/06* (2013.01); *E21B 34/08* (2013.01); *E21B 43/12* (2013.01); *E21B 43/34* (2013.01); *F16K 31/18* (2013.01); *F16K 31/22* (2013.01); *E21B 43/14* (2013.01)

(58) Field of Classification Search
CPC .......... F16K 33/00; F16K 31/18; F16K 31/22; E21B 34/06; E21B 34/08; E21B 34/142; E21B 43/14; E21B 43/12; E21B 43/34; B33Y 80/00; B29C 64/00–194
See application file for complete search history.

(56) References Cited

U.S. PATENT DOCUMENTS

| | | |
|---|---|---|
| 7,290,606 B2 | 11/2007 | Coronado et al. |
| 10,822,920 B2 | 11/2020 | Killie et al. |
| 2008/0041580 A1 | 2/2008 | Freyer et al. |
| 2015/0308226 A1 | 10/2015 | Killie et al. |
| 2016/0258242 A1 | 9/2016 | Hayter et al. |
| 2017/0356273 A1 | 12/2017 | Bayh, III et al. |
| 2020/0291745 A1 | 9/2020 | Greci et al. |
| 2020/0308927 A1 | 10/2020 | Fripp et al. |
| 2021/0002978 A1 | 1/2021 | Killie et al. |
| 2021/0324707 A1* | 10/2021 | AlAdawy ............... F16K 31/18 |

FOREIGN PATENT DOCUMENTS

| | | | |
|---|---|---|---|
| WO | 2017086923 A1 | 5/2017 | |
| WO | WO-2019135814 A1 * | 7/2019 | ............. E21B 34/08 |

* cited by examiner

*Primary Examiner* — George S Gray
(74) *Attorney, Agent, or Firm* — Scott Richardson; Parker Justiss, P.C.

(57) ABSTRACT

A float for use with a fluid flow control device. The float, in at least one aspect, includes a fluid impermeable exterior, and a base material having one or more cavities positioned within the fluid impermeable exterior, the base material formed using an additive manufacturing process.

20 Claims, 16 Drawing Sheets

US 11,892,096 B2

ADDITIVE MANUFACTURED FLOATS FOR USE IN A DOWNHOLE ENVIRONMENT

BACKGROUND

Wellbores are sometimes drilled from the surface of a wellsite several hundred to several thousand feet downhole to reach hydrocarbon resources. During certain well operations, such as production operations, certain fluids, such as fluids of hydrocarbon resources, are extracted from the formation, where fluids of hydrocarbon resources flow into one or more sections of a conveyance such as a section of a production tubing, and through the production tubing, uphole to the surface. During production operations, other types of fluids, such as water, sometimes also flow into the section of production tubing while fluids of hydrocarbon resources are being extracted.

BRIEF DESCRIPTION

Reference is now made to the following descriptions taken in conjunction with the accompanying drawings, in which.

Figure 7:
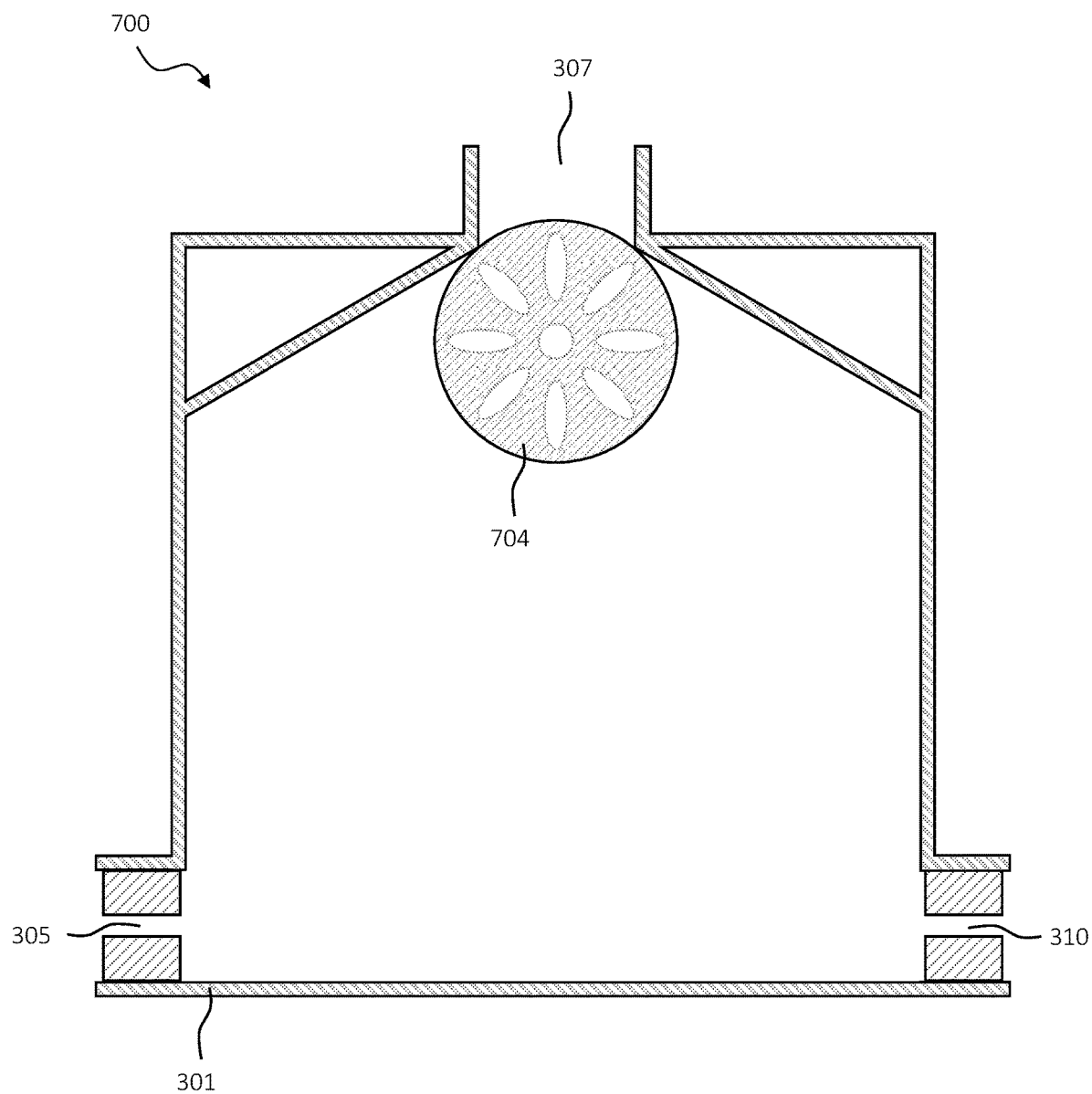
FIG. 7 illustrates a cross-sectional view of an alternative embodiment of a fluid flow control device designed, manufactured, and operated according to one or more embodiments of the disclosure.
Figure 9:
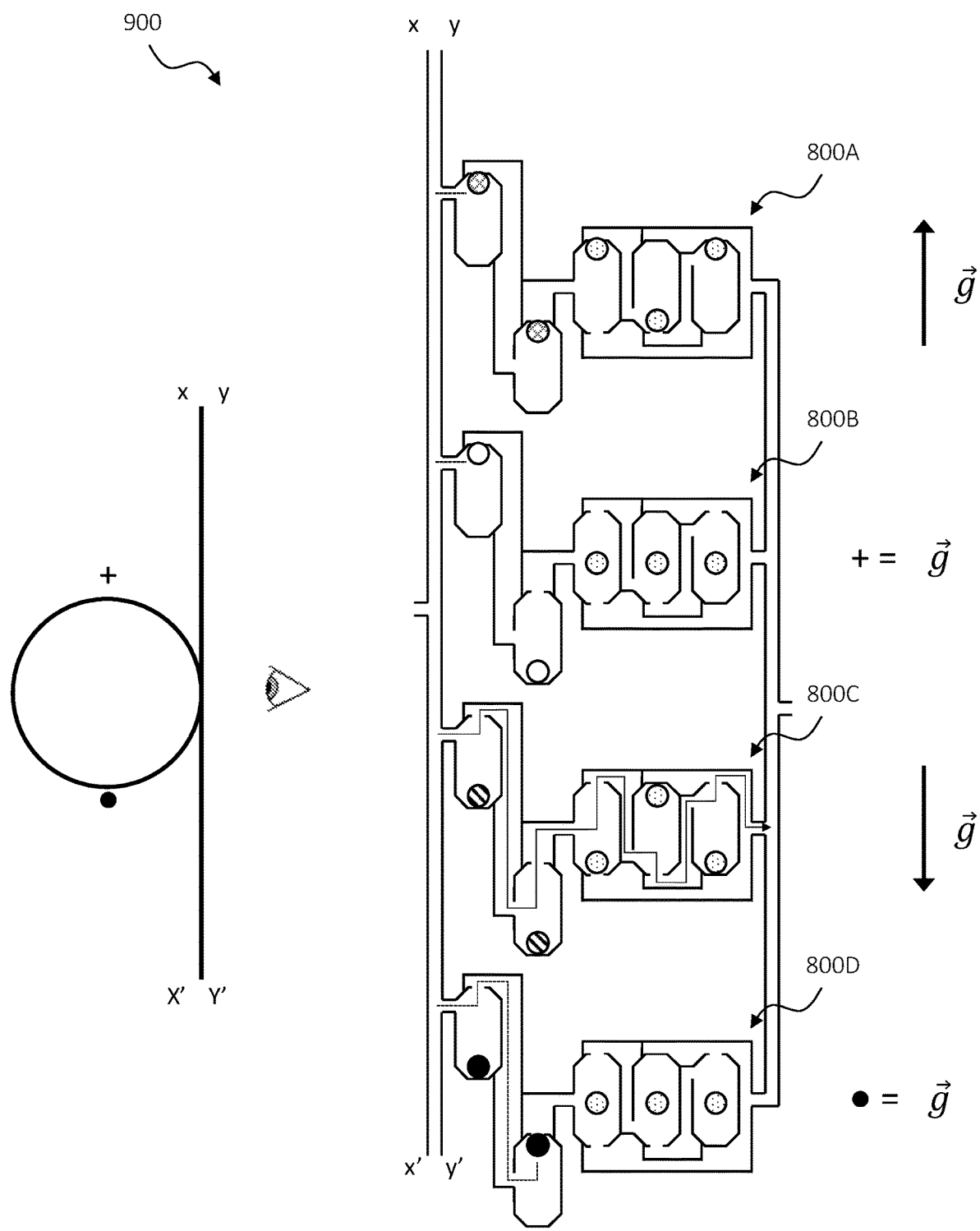

FIG. 9 illustrates a rolled-out view)(360° of a device comprising four orientation dependent inflow control apparatuses equidistantly distributed around the perimeter outside of a basepipe (not shown); and FIGS. 10A through 10E illustrate cross-sectional views of a variety of different floats (e.g., paddled shaped floats) designed, manufactured, and operated according to one or more embodiments of the disclosure, as might be used with the fluid flow control device of FIG. 7.

DETAILED DESCRIPTION

In the drawings and descriptions that follow, like parts are typically marked throughout the specification and drawings with the same reference numerals, respectively. The drawn figures are not necessarily to scale. Certain features of the disclosure may be shown exaggerated in scale or in somewhat schematic form and some details of certain elements may not be shown in the interest of clarity and conciseness. The present disclosure may be implemented in embodiments of different forms.

Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results.

Unless otherwise specified, use of the terms "connect," "engage," "couple," "attach," or any other like term describing an interaction between elements is not meant to limit the interaction to direct interaction between the elements and may also include indirect interaction between the elements described. Unless otherwise specified, use of the terms "up," "upper," "upward," "uphole," "upstream," or other like terms shall be construed as generally away from the bottom, terminal end of a well, regardless of the wellbore orientation.; likewise, use of the terms "down," "lower," "downward," "downhole," or other like terms shall be construed as generally toward the bottom, terminal end of a well, regardless of the wellbore orientation. Use of any one or more of the foregoing terms shall not be construed as denoting positions along a perfectly vertical axis. In some instances, a part near the end of the well can be horizontal or even slightly directed upwards. Unless otherwise specified, use of the term "subterranean formation" shall be construed as encompassing both areas below exposed earth and areas below earth covered by water such as ocean or fresh water.

The present disclosure relates, for the most part, to fluid flow control devices and downhole floats. The fluid flow control device, in at least one embodiment, includes an inlet port and an outlet port. The fluid flow control device, in at least this embodiment, also includes a float that is positioned between the inlet port and the outlet port. The float is operable to move between an open position that permits fluid flow through the outlet port and a closed position that restricts fluid flow through the outlet port. As referred to herein, an open position is a position of the float where the float does not restrict fluid flow through the outlet port, whereas a closed position is a position of the float where the float restricts fluid flow through the outlet port. In some embodiments, the float shifts radially inwards toward the outlet port to move from an open position to a closed position, and shifts radially outwards away from the outlet port to move from the closed position to the open position. In some embodiments, the float shifts radially outwards toward the outlet port to move from an open position to a closed position, and shifts radially inward away from the outlet port to move from the closed position to the open position. As referred to herein, radially inwards means shifting radially towards the center, such as the central axis, whereas radially outwards means shifting away from the center, such as away from the central axis.

In some embodiments, the float shifts circumferentially (such as circumferentially about a flow pathway of a port) from a first position to a second position to move from an open position to a closed position, and shifts from the second position to the first position to move from the closed position to the open position. In some embodiments, the float shifts linearly from a first position to a second position to move from an open position to a closed position, and shifts linearly from the second position to the first position to move from the closed position to the open position. In yet another embodiment, the float is contained within an enclosure of fluid that it is able to freely move within, the float operable to float from a first position to a second position to move from an open position to a closed position, and sink from the second position to the first position to move from the closed position to the open position. In some embodiments, the float opens to permit certain types of fluids having densities that are less than a threshold density (such as oil and other types of hydrocarbon resources) to flow through the outlet port, and restricts other types of fluids having densities greater than or equal to the threshold density (such as water and drilling fluids) from flowing through the outlet port.

The present disclosure is based, at least in part, on the acknowledgment that there is a need for low density floats for use in downhole environments. The present disclosure has further acknowledged that such downhole environments see extreme hydrostatic pressures, high temperatures, a variety of harsh chemicals, and typically require a long service life, and that there is not a good solution for downhole components with a density lower than 1.3 specific gravity (sg). Based, at least in part on the foregoing acknowledgements, the present disclosure has recognized for the first time that a solution to the forgoing is manufacturing downhole floats using an additive manufacturing process, but based upon using downhole field proven materials. The present disclosure has recognized that that lower density may be obtained by leaving cavities (e.g., voids) in the structure. These cavities can be tailored to reduce the net density of the part, while providing strength to the part to handle the extreme hydrostatic pressures.

In at least one embodiment, additive manufactured PEEK floats may be used with density autonomous inflow control devices (ICDs). Often, there is a need for the float's density to be between that of oil and water (e.g., 0.75 sg and 1.0 sg, respectively) or between gas and liquids (e.g., 0.1 sg and 0.75 sg, respectively). By employing an additive manufacturing process, these floats can obtain a net density in this range, while using a material with a native density higher than that of water, an in certain embodiments a native density of at least 1.3 sg. This also allows quick customization of the parts shape, density, and its center of gravity location.

While the above example has been discussed with regard to PEEK, a number of different materials and compositions may be used. In at least one embodiment, a thermoplastic such as PEEK, PEI, ABS, PLA, nylon, PEKK, Ultem, polyamide, a thermoplastic elastomer, etc., could be used. In at least one other embodiment, a thermoset, including a resin and an epoxy, could be used. In at least one other embodiment, the metal is additive manufactured, for example as aluminum, titanium, magnesium, etc.

In yet another embodiment, the material can be a degradable material for a temporary fluid selection during installation, such as PLA, PGA or polystyrene. In yet another embodiment, the material can be a composition of materials, such as with the addition of small (e.g., chopped) fibers, carbon particles, metal powders, etc. Furthermore, the additive manufactured part may be coated, such as with a metal coating or a plasma electrolytic oxidation coating, among others. This coating may be applied in a process that is different from the additive manufacturing process, or alternatively in the same process.

Thus, additive manufactured, hermetically sealed floats can provide a net density less than 1.3 sg. The additive manufacturing allows one to alter the shape quickly, adjust the center of gravity, and adjust the final net density quickly. The additive manufactured part allows for internal support structures to be included inside the floats to provide the lower density (due to the voids) and high compressive strength to support against the hydrostatic pressure. The additive manufactured floats are designed to sink and float in a variety of downhole fluids such as: gas, oil, water/brine, and mud. The floats may be used to block or unblock flow paths in downhole flow control devices. The floats can be free floating, hinged, sliding, or any other mechanism that uses their buoyancy or a combination of buoyancy and mechanical advantage to open or close a flow path.

Figure 1:
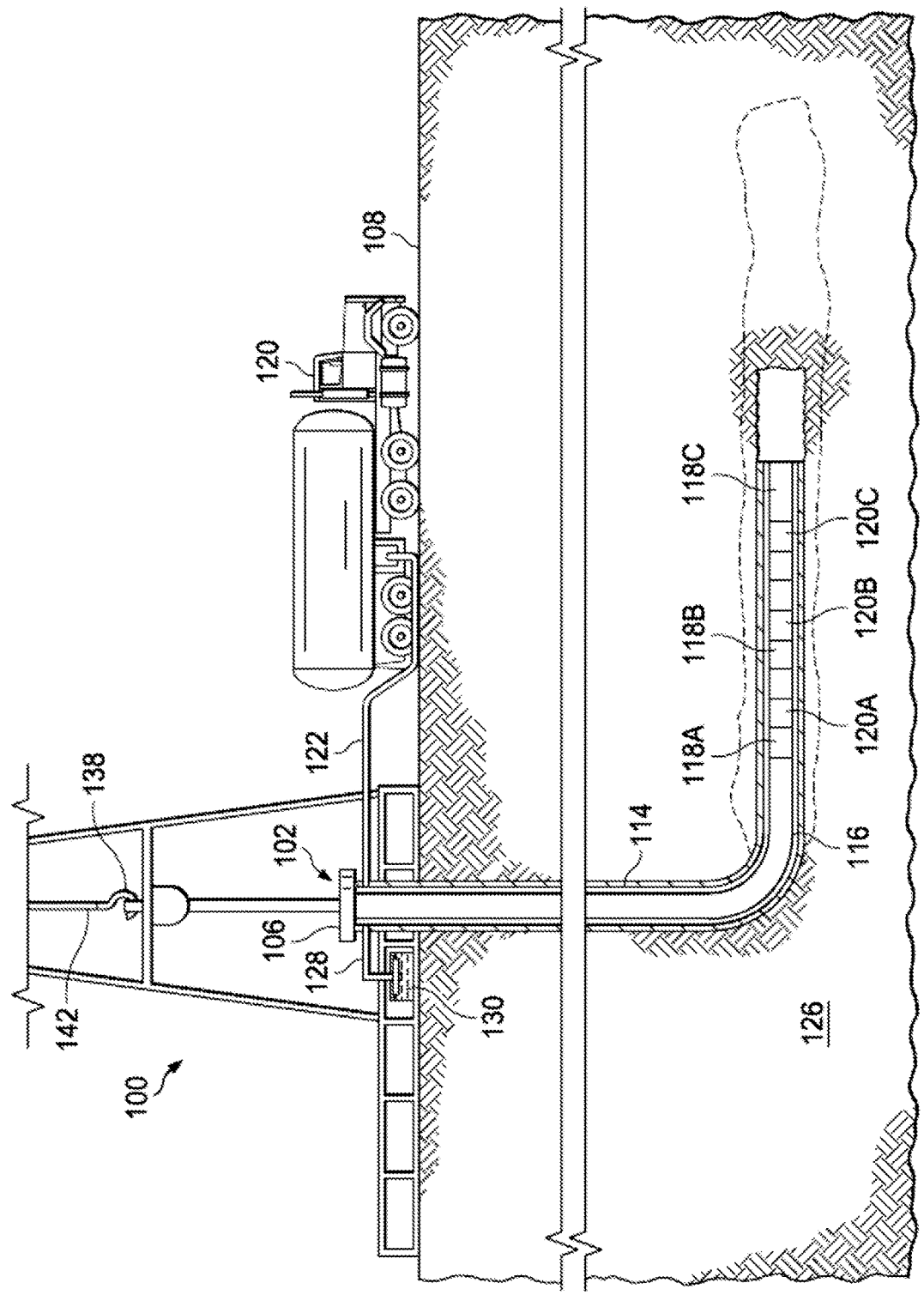
FIG. 1 illustrates a schematic, side view of a well system in which inflow control devices are deployed in a wellbore.

Turning now to the figures, FIG. 1 illustrates a schematic, side view of a well system 100 in which inflow control devices 120A-120C are deployed in a wellbore 114. As shown in FIG. 1, wellbore 114 extends from surface 108 of well 102 to or through formation 126. A hook 138, a cable 142, traveling block (not shown), and hoist (not shown) may be provided to lower conveyance 116 into well 102. As referred to herein, conveyance 116 is any piping, tubular, or fluid conduit including, but not limited to, drill pipe, production tubing, casing, coiled tubing, and any combination thereof. Conveyance 116 provides a conduit for fluids extracted from formation 126 to travel to surface 108. In some embodiments, conveyance 116 additionally provides a conduit for fluids to be conveyed downhole and injected into formation 126, such as in an injection operation. In some embodiments, conveyance 116 is coupled to a production tubing that is arranged within a horizontal section of well 102. In the embodiment of FIG. 1, conveyance 116 and the production tubing are represented by the same tubing.

At wellhead 106, an inlet conduit 122 is coupled to a fluid source 120 to provide fluids through conveyance 116 downhole. For example, drilling fluids, fracturing fluids, and injection fluids are pumped downhole during drilling operations, hydraulic fracturing operations, and injection operations, respectively. In the embodiment of FIG. 1, fluids are circulated into well 102 through conveyance 116 and back toward surface 108. To that end, a diverter or an outlet conduit 128 may be connected to a container 130 at the wellhead 106 to provide a fluid return flow path from wellbore 114. Conveyance 116 and outlet conduit 128 also form fluid passageways for fluids, such as hydrocarbon resources to flow uphole during production operations.

In the embodiment of FIG. 1, conveyance 116 includes production tubular sections 118A-118C at different production intervals adjacent to formation 126. In some embodiments, packers (now shown) are positioned on the left and right sides of production tubular sections 118A-118C to define production intervals and provide fluid seals between the respective production tubular section 118A, 118B, or 118C, and the wall of wellbore 114. Production tubular sections 118A-118C include inflow control devices 120A-120C (ICDs). An inflow control device controls the volume or composition of the fluid flowing from a production interval into a production tubular section, e.g., 118A. For example, a production interval defined by production tubular section 118A produces more than one type of fluid component, such as a mixture of oil, water, steam, carbon dioxide, and natural gas. Inflow control device 120A, which is fluidly coupled to production tubular section 118A, reduces or restricts the flow of fluid into the production tubular section 118A when the production interval is producing a higher proportion of an undesirable fluid component, such as water, which permits the other production intervals that are producing a higher proportion of a desired fluid component (e.g., oil) to contribute more to the production fluid at surface 108 of well 102, so that the production fluid has a higher proportion of the desired fluid component. In some embodiments, inflow control devices 120A-120C are an autonomous inflow control devices (AICD) that permits or restricts fluid flow into the production tubular sections 118A-118C based on fluid density, without requiring signals from the well's surface by the well operator.

Although the foregoing paragraphs describe utilizing inflow control devices 120A-120C during production, in some embodiments, inflow control devices 120A-120C are also utilized during other types of well operations to control fluid flow through conveyance 116. Further, although FIG. 1 depicts each production tubular section 118A-118C having an inflow control device 120A-120C, in some embodiments, not every production tubular section 118A-118C has an inflow control device 120A-120C. In some embodiments, production tubular sections 118A-118C (and inflow control devices 120A-120C) are located in a substantially vertical section additionally or alternatively to the substantially horizontal section of well 102. Further, any number of production tubular sections 118A-118C with inflow control devices 120A-120C, including one, are deployable in the well 102. In some embodiments, production tubular sections 118A-118C with inflow control devices 120A-120C are disposed in simpler wellbores, such as wellbores having only a substantially vertical section. In some embodiments, inflow control devices 120A-120C are disposed in cased wells or in open-hole environments.

In at least one embodiment, one or more of the inflow control devices 120A-120C include one or more floats designed, manufactured, and operated according to the disclosure. In accordance with at least one embodiment, the one or more floats include a fluid impermeable exterior, as well as a base material having one or more cavities positioned within the fluid impermeable exterior. In accordance with one embodiment of the disclosure, the base material is formed using an additive manufacturing process. The phrase "fluid impermeable," as used herein, is intended to mean that the permeability of the exterior is less than 0.1 millidarcy. The phrase "additive manufacturing process," as used herein, is intended to encompass all processes in which material is deposited, joined, or solidified under computer control to create a three-dimensional object, with material being added together (such as plastics, liquids or powder grains being fused together), typically layer by layer. In at least one embodiment, the base material, the fluid impermeable exterior, or both the base material and the fluid impermeable exterior comprise a material with a specific gravity of at least 1.3 sg.

Figure 2:
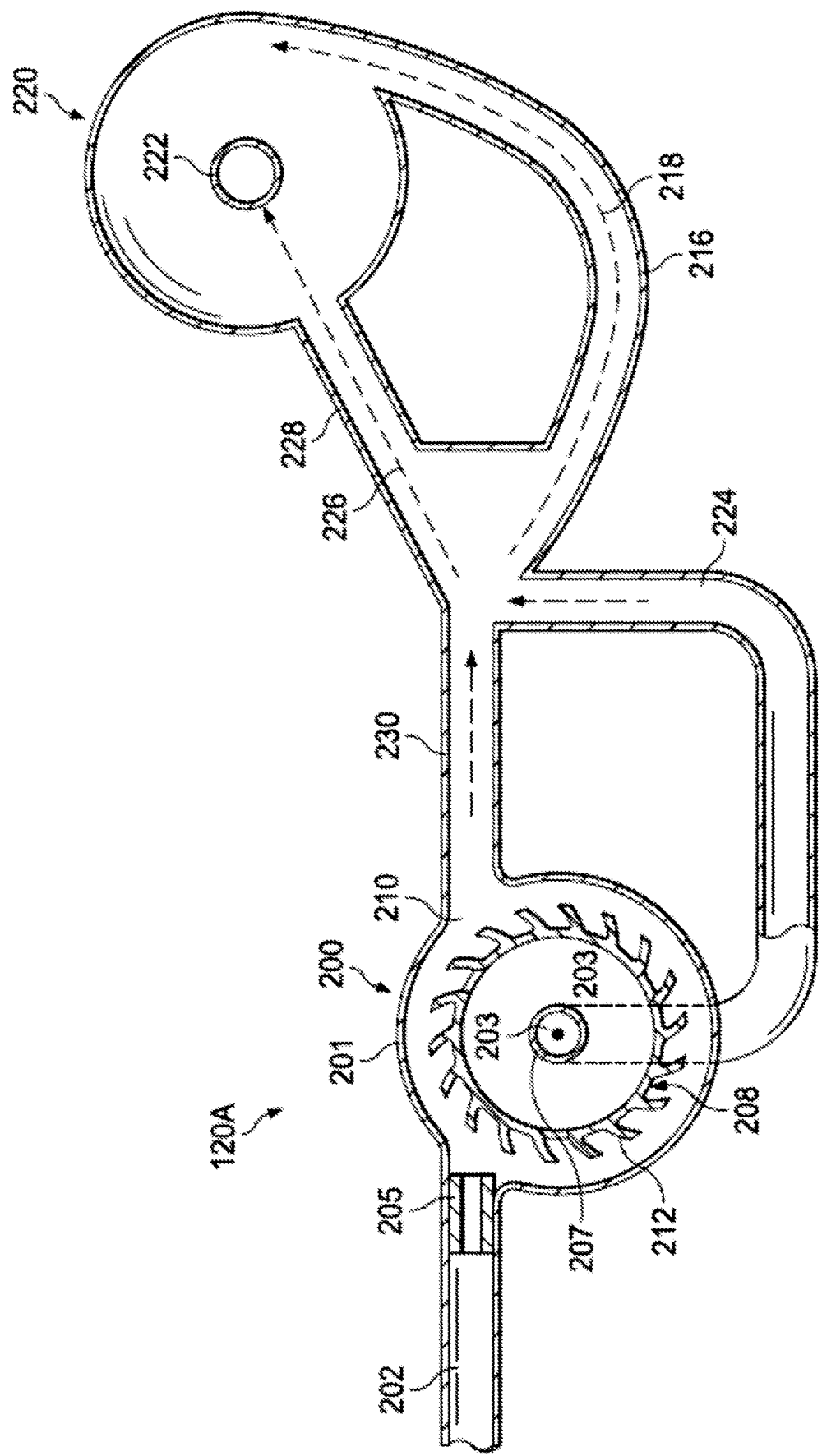
FIG. 2 illustrates a cross-sectional view of one embodiment of an inflow control device of FIG. 1.

FIG. 2 illustrates a cross-sectional view of one embodiment of an inflow control device 120A of FIG. 1. In the embodiments described in FIG. 2, inflow control device 120A includes an inflow tubular 200 of a well tool coupled to a fluid flow control device 202. Although the word "tubular" is used to refer to certain components in the present disclosure, those components have any suitable shape, including a non-tubular shape. Inflow tubular 200 provides fluid to fluid flow control device 202. In some embodiments, fluid is provided from a production interval in a well system or from another location. In the embodiment of FIG. 2, inflow tubular 200 terminates at an inlet port 205 that provides a fluid communication pathway into fluid flow control device 202. In some embodiments, inlet port 205 is an opening in a housing 201 of fluid flow control device 202.

A first fluid portion flows from inlet port 205 toward a bypass port 210. The first fluid portion pushes against fins 212 extending outwardly from a rotatable component 208 to rotate rotatable component 208 to rotate about an axis, such as a central axis 203. Rotation of rotatable component 208 about axis 203 generates a force on a float (not shown, but including a float designed and manufactured using an additive manufacturing process) positioned within rotatable component 208. After passing by rotatable component 208, the first fluid portion exits fluid flow control device 202 via bypass port 210. From bypass port 210, the first fluid portion flows through a bypass tubular 230 to a tangential tubular 216. The first fluid portion flows through tangential tubular 216, as shown by dashed arrow 218, into a vortex valve 220. In the embodiment of FIG. 2, the first fluid portion spins around an outer perimeter of vortex valve 220 at least partially due to the angle at which the first fluid portion enters vortex valve 220. Forces act on the first fluid portion, eventually causing the first fluid portion to flow into a central port 222 of vortex valve 220. The first fluid portion then flows from central port 222 elsewhere, such as to a well surface as production fluid.

At the same time, a second fluid portion from inlet port 205 flows into rotatable component 208 via holes in rotatable component 208 (e.g., holes between fins 212 of rotatable component 208). If the density of the second fluid portion is high, the float moves to a closed position, which prevents the second fluid portion from flowing to an outlet port 207, and instead cause the second fluid portion to flow out bypass port 210. If the density of the second fluid portion is low (e.g., if the second fluid portion is mostly oil or gas), then the float moves to an open position that allows the second fluid portion to flow out the outlet port 207 and into a control tubular 224. In this manner, fluid flow control device 202 autonomously directs fluids through different pathways based on the densities of the fluids. The control tubular 224 directs the second fluid portion, along with the first fluid portion, toward central port 222 of vortex valve 220 via a more direct fluid pathway, as shown by dashed arrow 226 and defined by tubular 228. The more direct fluid pathway to central port 222 allows the second fluid portion to flow into central port 222 more directly, without first spinning around the outer perimeter of vortex valve 220. If the bulk of the fluid enters vortex valve 220 along the pathway defined by dashed arrow 218, then the fluid will tend to spin before exiting through central port 222 and will have a high fluid resistance. If the bulk of the fluid enters vortex valve 220 along the pathway defined by dashed arrow 226, then the fluid will tend to exit through central port 222 without spinning and will have minimal flow resistance.

In some embodiments, the above-mentioned concepts are enhanced by the rotation of rotatable component 208. Typically, the buoyancy force generated by the float is small because the difference in density between the lower-density fluid and the higher-density fluid is generally small, and there is only a small amount (e.g., 5 milli-Newtons) of gravitational force acting on this difference in density. This makes fluid flow control device 202 sensitive to orientation, which causes the float to get stuck in the open position or the closed position. However, rotation of rotatable component 208 creates a force (e.g., a centripetal force or a centrifugal force) on the float. The force acts as artificial gravity that is much higher than the small gravitational force naturally acting on the difference in density. This allows fluid flow control device 202 to more reliably toggle between the open and closed positions based on the density of the fluid. This also makes fluid flow control device 202 perform in a manner that is insensitive to orientation, because the force generated by rotatable component 208 is much larger than the naturally occurring gravitational force.

In some embodiments, fluid flow control device 202 directs a fluid along the more direct pathway shown by dashed arrow 226 or along the tangential pathway shown by dashed arrow 218. In one or more of such embodiments, whether fluid flow control device 202 directs the fluid along the pathway shown by dashed arrow 226 or the dashed arrow 218 depends on the composition of the fluid. Directing the fluid in this manner causes the fluid resistance in vortex valve 220 to change based on the composition of the fluid.

In some embodiments, fluid flow control device 202 is compatible with any type of valve. For example, although FIG. 2 includes a vortex valve 220, in other embodiments, vortex valve 220 is replaced with other types of fluidic valves, including valves that have a moveable valve-element, such as a rate-controlled production valve. Further, in some embodiments, fluid control device 202 operates as a pressure sensing module in a valve.

Figure 3:
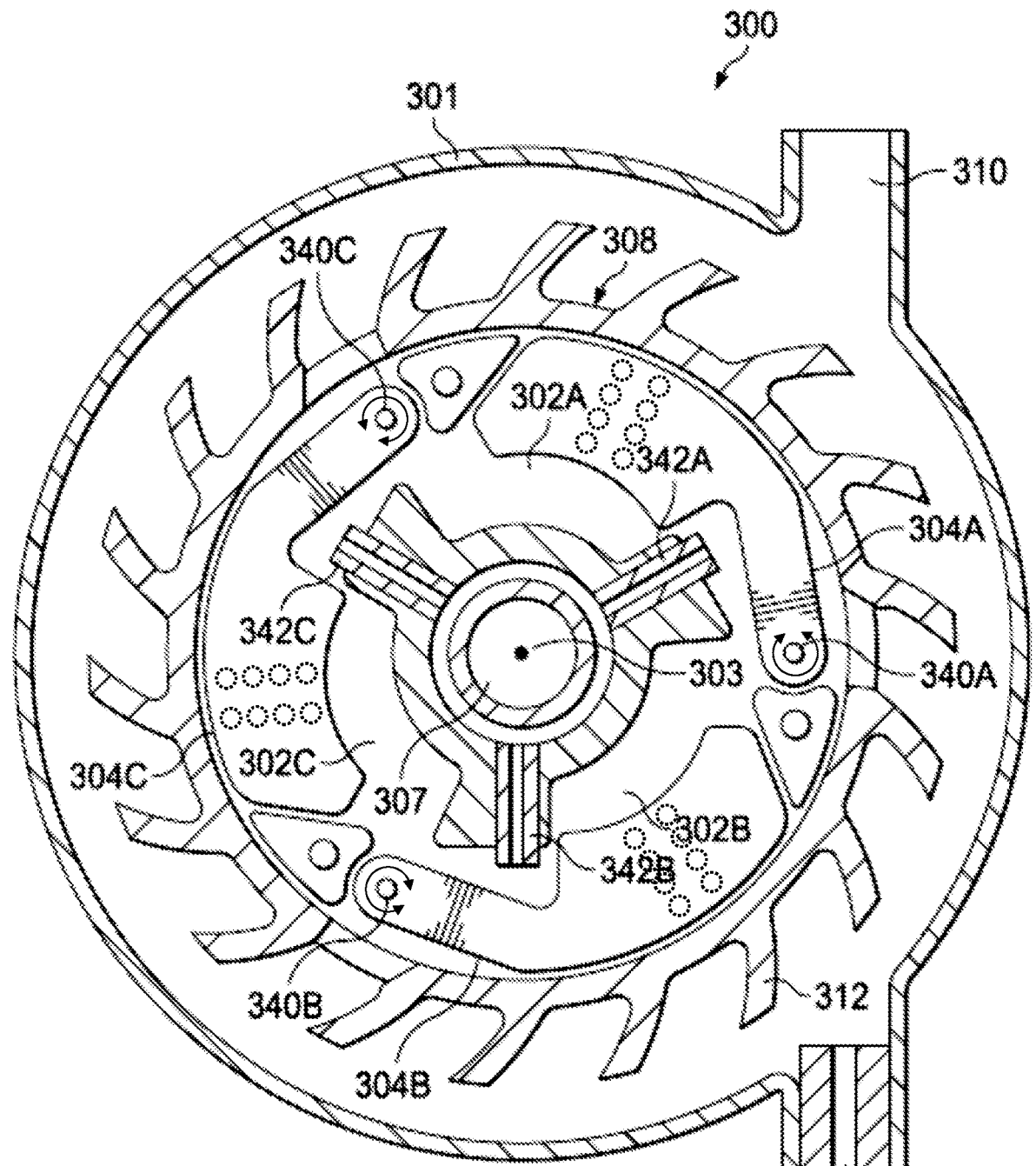
FIG. 3 illustrates a cross-sectional view of a fluid flow control device similar in certain embodiments to fluid flow control device of FIG. 2.

FIG. 3 is a cross-sectional view of a fluid flow control device 300 similar in certain embodiments to fluid flow control device 200 of FIG. 2. With reference now to FIG. 3, fluid flow control device 300 includes a rotatable component 308 positioned within a housing 301 of fluid flow control device 300. Fluid flow control device 300 also includes an inlet port 305 that provides a fluid passage for fluids such as, but not limited to, hydrocarbon resources, wellbore fluids, water, and other types of fluids to flow into housing 301. Fluid control device 300 also includes an outlet port 310 that provides a fluid flow path for fluids to flow out of fluid flow control device 300, such as to vortex valve 220 of FIG. 2. Some of the fluids that flow into housing 301 also come into contact with rotatable component 308, where force generated by fluids flowing onto rotatable component 308 rotates rotatable component 308 about axis 303. In some embodiments, fluids flowing through inlet port 305 push against fins, including fin 312, which are coupled to rotatable component 308, where the force of the fluids against the fins rotates rotatable component 308 about axis 303. Three floats 304A-304C are positioned within the rotatable component 308 and are connected to the rotatable component 308 by hinges 340A-340C, respectively, where each hinge 340A, 340B, and 340C provides for movement of a respective float 304A, 304B, and 304C relative to rotatable component 308 between the open and closed positions. In some embodiments, movements of each float 304A, 304B, and 304C between the open and the closed positions are based on fluid densities of fluids in rotatable component 308.

In some embodiments, movement of floats 304A-304C back and forth between the open and closed positions is accomplished by hinging each respective float 304A, 304B, or 304C on its hinge 340A, 340B, or 340C. In some embodiments, each hinge 340A, 340B, and 340C includes a pivot rod (not shown) mounted to rotatable component 308 and passing at least partially through float 304A, 304B, and 304C, respectively. In some embodiments, in lieu of the pivot rod mounted to rotatable component 308, each float 304A, 304B, and 304C has bump extensions that fit into recesses of rotatable component 308 for use as a hinge. In some embodiments, floats 304A-304C are configured to move back and forth from the open and closed positions in response to changes in the average density of fluids, including mixtures of water, hydrocarbon gas, and/or hydrocarbon liquids, introduced at inlet port 305. For example, floats 304A-304C are movable from the open position to the closed position in response to the fluid from inlet port 305 being predominantly water or mud, wherein the float component is movable from the closed position to the open position in response to the fluid from the inlet port 305 being predominantly a hydrocarbon, such as oil or gas.

In the embodiment of FIG. 3, rotatable component 308 includes three fluid pathways 342A-342C that provide fluid communication between inlet port 305 and an outlet port 307. Further, each fluid pathway 342A, 342B, and 342C is fluidly connected to a chamber 302A, 302B, and 302C, respectively. Moreover, each float 304A, 304B, and 304C is disposed in a chamber 302A, 302B, and 302C, respectively, such that shifting a float 304A, 304B, or 304C from an open position to a closed position restricts fluid flow through a corresponding fluid pathway 342A, 342B, or 342C, respectively, whereas shifting float 304A, 304B, or 304C from the closed position to the open position permits fluid flow through corresponding fluid pathway 342A, 342B, or 342C. In some embodiments, float 304A, 304B, or 304C permits or restricts fluid flow through fluid pathway 342A, 342B, or 342C, respectively, based on the density of the fluid in chamber 302A, 302B, or 302C, respectively. Although FIG. 3 illustrates three floats 304A-304C positioned in three chambers 302A-202C, respectively, in some embodiments, a different number of floats positioned in a different number of chambers are placed in rotatable component 308. Further, although FIG. 3 illustrates three fluid pathways 342A-342C, in some embodiments, rotatable component 308 includes a different number of fluid pathways that fluidly connect inlet port 305 to outlet port 307. Further, although FIG. 3 illustrates three floats 304A-304C positioned in three chambers 302A-202C, respectively, in some embodiments, a different number of floats positioned in a different number of chambers are placed in rotatable component 308. Further, although FIG. 3 illustrates three fluid pathways 342A-342C, in some embodiments, rotatable component 308 includes a different number of fluid pathways that fluidly connect inlet port 305 to outlet port 307.

In the illustrated embodiment, at least a portion of the one or more of the floats 304A-304C has been formed using an additive manufacturing process. In the illustrated embodiment of FIG. 3, an entirety of each of the floats 304A-304C has been formed using the additive manufacturing process. For example, each of the floats 304A-304C includes a fluid impermeable exterior that surrounds a base material having one or more cavities positioned therein, the fluid impermeable exterior and the base material having been formed using an additive manufacturing process. In other embodiments, however, only the base material is formed using the additive manufacturing process, with the fluid impermeable exterior being added using another different manufacturing process. Using the additive manufacturing process, the net density of the floats 304A-304C may be specifically tailored, for example to a net specific gravity value between oil and water. Moreover, the net density may be tailored, while using materials with a native density greater than both oil and water, for example using materials with a native density of at least 1.3 sg.

FIGS. 4A through 4E illustrate cross-sectional views of a variety of different floats (e.g., paddled shaped floats) 404A-404E designed, manufactured, and operated according to one or more embodiments of the disclosure, as might be used with the fluid flow control device 300 of FIG. 3. For example, each of the floats 404A-404E could be configured to move back and forth between the open and closed positions by rotating about a hinge point.

Each of the different floats 404A-404E, or at least a portion of each of the different floats 404A-404E, has been formed using the aforementioned additive manufacturing process. Specifically, the additive manufacturing process has been employed to provide a float 404A-404E having a highly specific net density (e.g., combined density of all the associated parts of the float). In at least one embodiment, the additive manufacturing process has been employed to provide a net density that is above a first density of a desired fluid and below a second density of an undesired fluid. In another embodiment, the additive manufacturing process has been employed to provide a net density that is above a first density of an undesired fluid and below a second density of a desired fluid. In at least one other embodiment, the native density of the base material and/or the fluid impermeable exterior is greater than the first density or the second density. For example, the native density of the base material and/or the fluid impermeable exterior may be 1.3 sg or greater.

Figure 4A:
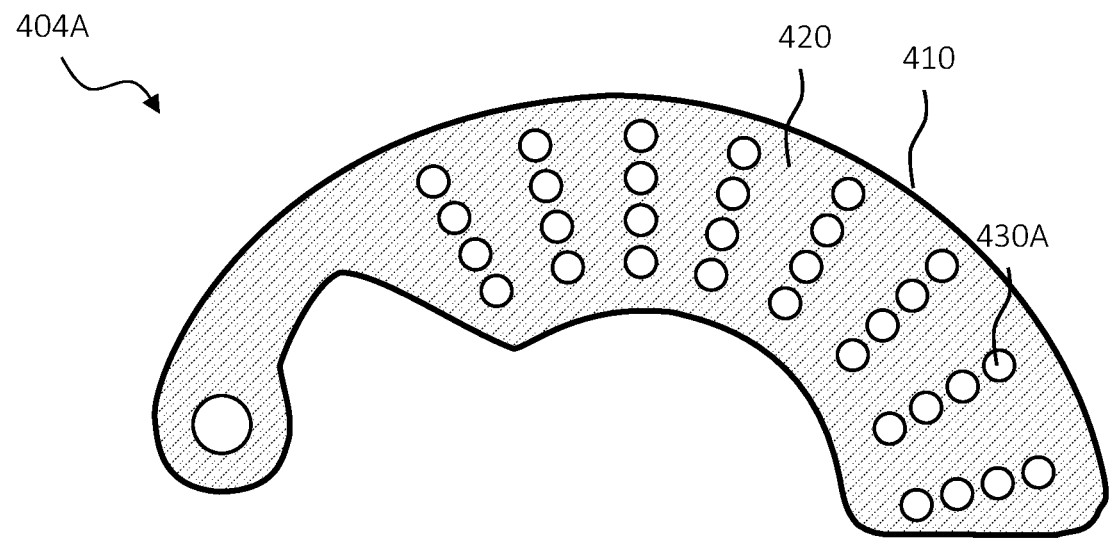
FIGS. 4A through 4E illustrate cross-sectional views of a variety of different floats (e.g., paddled shaped floats) designed, manufactured, and operated according to one or more embodiments of the disclosure, as might be used with the fluid flow control device of FIG. 3.

With initial reference to FIG. 4A, illustrated is one embodiment of a float 404A designed, manufactured, and operated according to one or more embodiments of the disclosure. The float 404A includes a fluid impermeable exterior 410. The fluid impermeable exterior 410, in at least one embodiment, provides a hermetic seal. The term "hermetic", as used herein, is intended to include a seal that remains airtight and/or fluid tight up to at least 70 Bar (e.g., about 1000 psi) and in some embodiments up to at least 700 Bar (e.g., about 10,000 psi) as well as at temperatures over 50° C. (e.g., about 120° F.) and in other cases to temperatures over 175° C. (e.g., over about 350° F.).

The float 404A additionally includes a base material 420 having one or more cavities 430A positioned within the fluid impermeable exterior 410. As discussed above, in at least one embodiment, the base material 420 and optionally the fluid impermeable exterior 410, are formed using an additive manufacturing process. In the illustrated embodiment, the base material 420 includes a plurality of separate cavities 430A, which is certain examples is four or more separate cavities. In the embodiment of FIG. 4A, the plurality of separate cavities 430A are a plurality of spherical cavities. Furthermore, the plurality of separate cavities 430A of the embodiment of FIG. 4A are substantially similarly shaped and/or similarly sized, if not entirely similar shaped or similarly sized, cavities 430A. The plurality of separate cavities 430A, in the illustrated embodiment, may additionally be substantially equally spaced cavities, and are optionally substantially equally distributed cavities. The term "substantially", as used herein with regard to shape, size, spacing, and distribution, is intended to include + or − ten percent of exactly shaped, sized or spaced. In other embodiments, a multitude of sizes of cavities 430A are used in order to allow more open space.

Further to the embodiment of FIG. 4A, the base material 420 comprises a first material and the fluid impermeable exterior 410 comprises a second material. The first material and the second material may be the same material, as is illustrated in FIG. 4A. In an alternative embodiment, the first material and the second material are different materials.

In at least one embodiment, the plurality of separate cavities 430A are filled with air. In yet another embodiment, the plurality of separate cavities 430A are filled with another fluid (e.g., gas and/or liquid) other than air. For example, the plurality of separate cavities 430A could be filed with an inert gas, such as nitrogen, $CO_2$, argon, etc., among others. In other embodiments, the plurality of separate cavities could be filled with an inert fluid, among other fluids.

Figure 4B:
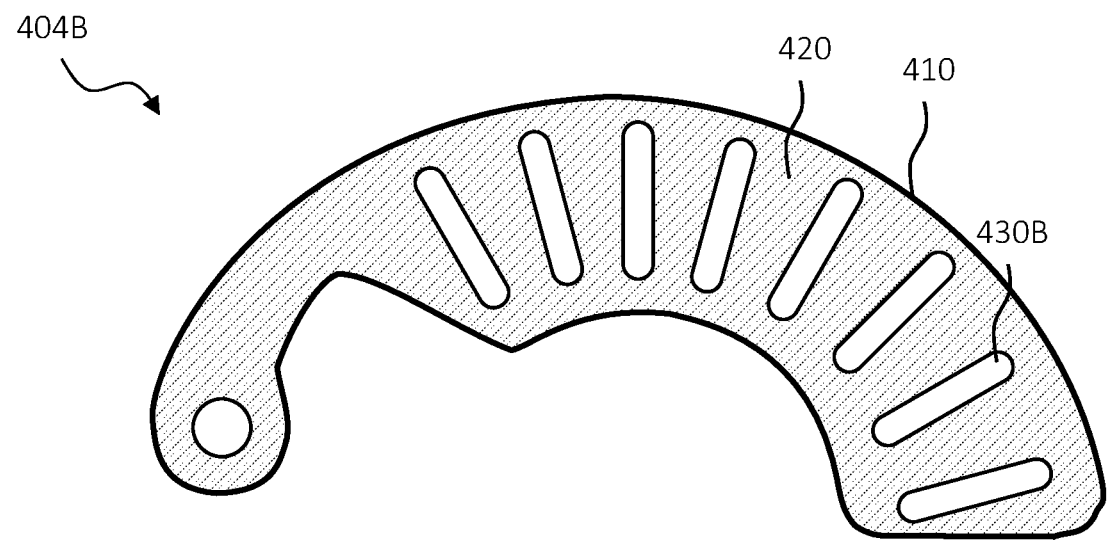

Turning now to FIG. 4B, illustrated is an alternative embodiment of a float 404B designed, manufactured, and operated according to another embodiment of the disclosure. The float 404B is similar in many respects to the float 404A of FIG. 4A. Accordingly, like reference numbers have been used to indicate similar, if not identical, features. The float 404B differs, for the most part, from the float 404A in that the float 404B employs multiple longitudinal shaped cavities 430B. The multiple longitudinal shaped cavities 430B, in the embodiment of FIG. 4B, are substantially equally spaced, and substantially equally distributed.

Figure 4C:
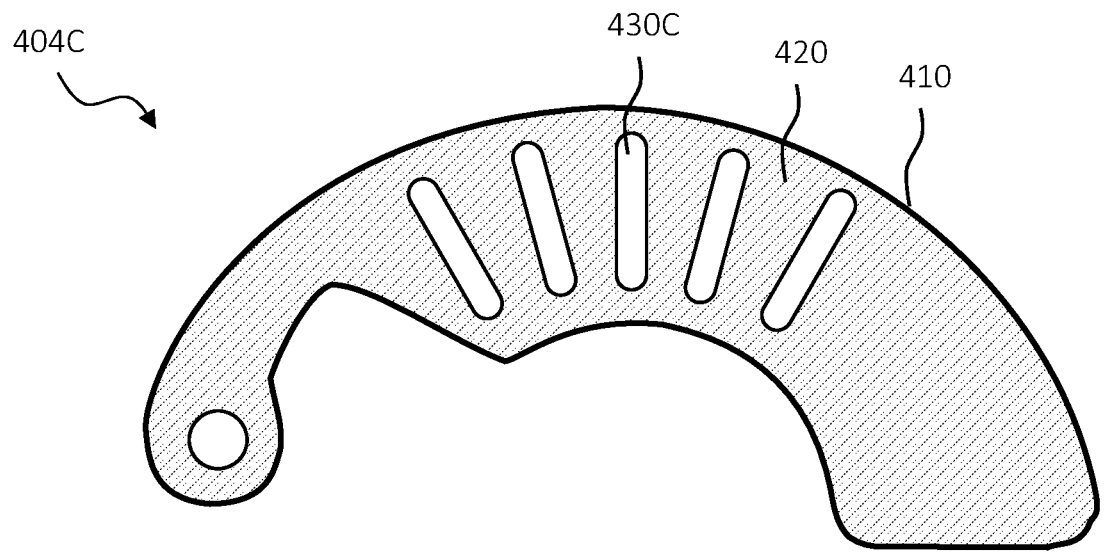

Turning now to FIG. 4C, illustrated is an alternative embodiment of a float 404C designed, manufactured, and operated according to another embodiment of the disclosure. The float 404C is similar in many respects to the float 404B of FIG. 4B. Accordingly, like reference numbers have been used to indicate similar, if not identical, features. The float 404C differs, for the most part, from the float 404B in that the float 404C employs multiple longitudinal shaped cavities 430C that are equally spaced, but are concentrated together to alter the center of gravity of the float 404C. For example, wherein a center of gravity of the float 404B would be substantially at a midpoint of a width and height of the float 404B, the center of gravity of the float 404C would be to the left of the midpoint of the width of the float 404C.

Figure 4D:
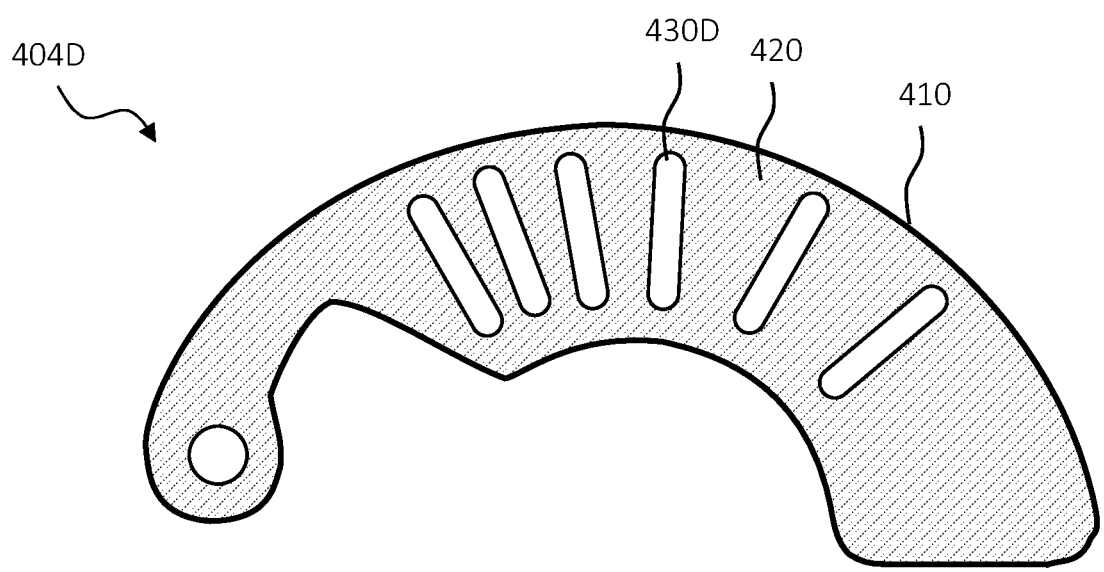

Turning now to FIG. 4D, illustrated is an alternative embodiment of a float 404D designed, manufactured, and operated according to another embodiment of the disclosure. The float 404D is similar in many respects to the float 404C of FIG. 4C. Accordingly, like reference numbers have been used to indicate similar, if not identical, features. The float 404D differs, for the most part, from the float 404C, in that the float 404D employs multiple longitudinal shaped cavities 430C that are gradiently spaced. Again, the gradient spacing may be used to change the location of the center of gravity of the float 404D. In an extension of this embodiment, the interior of the float can comprise a lattice.

Figure 4E:
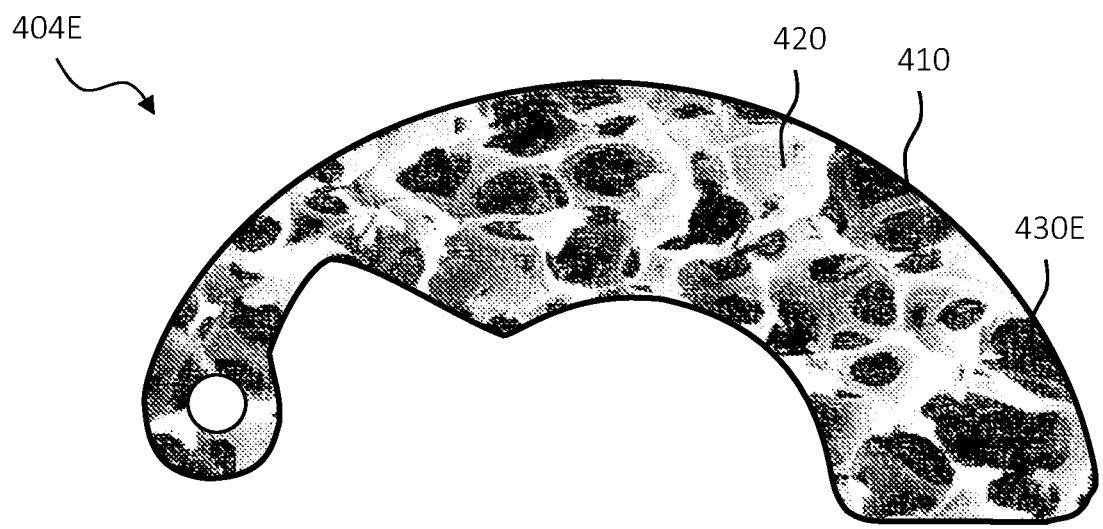

Turning now to FIG. 4E, illustrated is an alternative embodiment of a float 404E designed, manufactured, and operated according to another embodiment of the disclosure. The float 404E is similar in many respects to the float 404A of FIG. 4A. Accordingly, like reference numbers have been used to indicate similar, if not identical, features. The float 404E differs, for the most part, from the float 404A, in that the float 404E employs a foam structure 420 for its base material.

Figure 5:
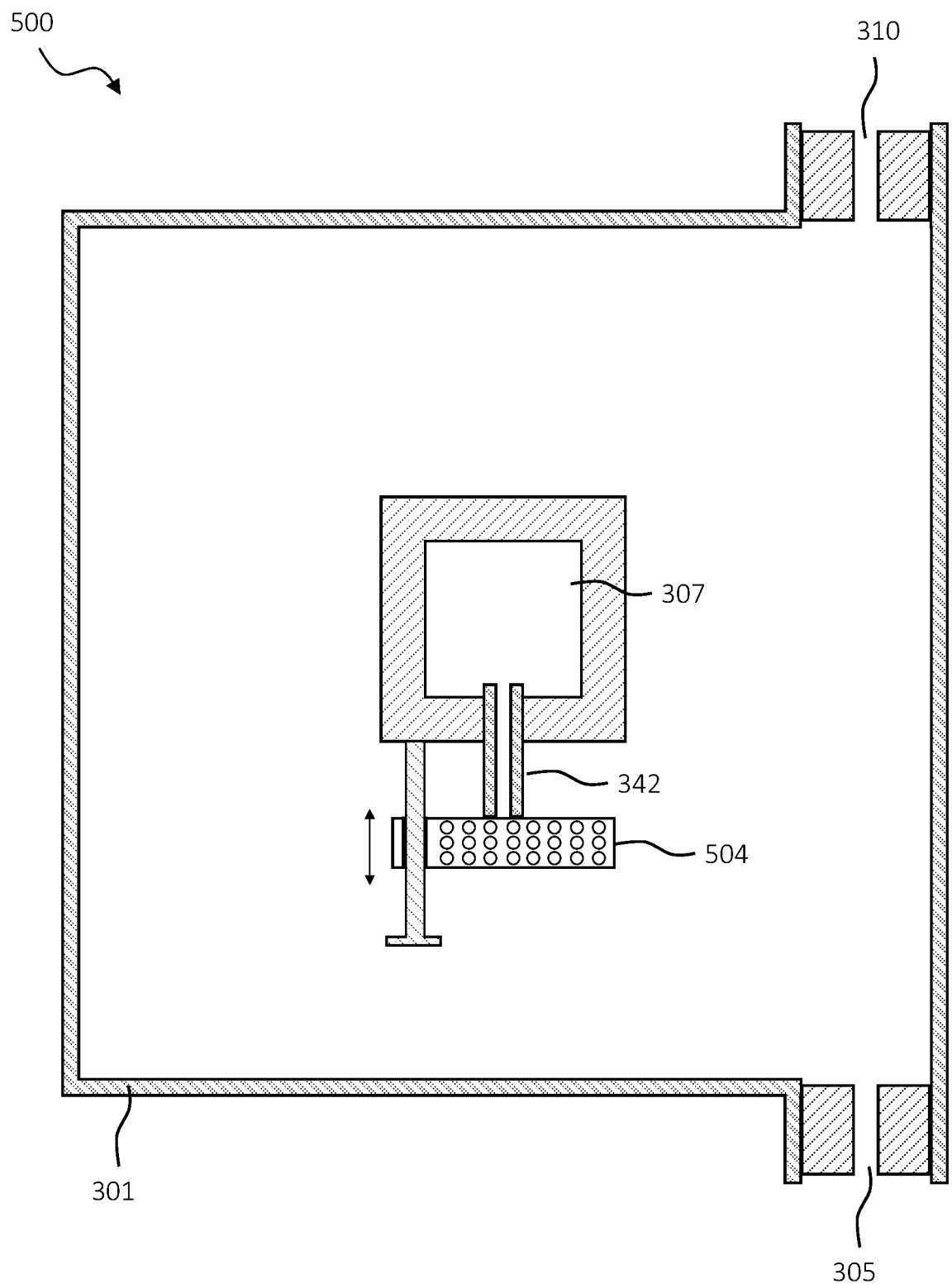
FIG. 5 illustrates a cross-sectional view of an alternative embodiment of a fluid flow control device designed, manufactured, and operated according to one or more embodiments of the disclosure.

Turning to FIG. 5, illustrated is a cross-sectional view of an alternative embodiment of a fluid flow control device 500 designed, manufactured, and operated according to one or more embodiments of the disclosure. The fluid flow control device 500 is similar in many respects to the fluid flow control device 300 of FIG. 3. Accordingly, like reference numbers have been used to indicate similar, if not identical, features. The fluid flow control device 500 differs, for the most part, from the fluid flow control device 300, in that the fluid flow control device 500 does not employ the rotatable component 308. Alternatively, the fluid flow control device 500 employs a single paddle shaped float 504. The single paddle shaped float 504, in at least the illustrated embodiment, is operable to slide (e.g., linearly slide in one embodiment) between the open and closed positions, for example based upon the density of the fluid within the housing 301.

FIGS. 6A through 6E illustrate cross-sectional views of a variety of different floats (e.g., paddled shaped floats) 604A-604E designed, manufactured, and operated according to one or more embodiments of the disclosure, as might be used with the fluid flow control device 500 of FIG. 6. For example, each of the floats 604A-604E could be configured to slide (e.g., linearly slide) back and forth between the open and closed positions.

Each of the different floats 604A-604E, or at least a portion of each of the different floats 604A-604E, has been formed using the aforementioned additive manufacturing process. Specifically, the additive manufacturing process has been employed to provide a float 604A-604E having a highly specific net density (e.g., combined density of all the associated parts of the float). In at least one embodiment, the additive manufacturing process has been employed to provide a net density that is above a first density of a desired fluid and below a second density of an undesired fluid. In at least one other embodiment, the native density of the base material and/or the fluid impermeable exterior is greater than the first density or the second density. For example, the native density of the base material and/or the fluid impermeable exterior may be 1.3 sg or greater.

Figure 6A:
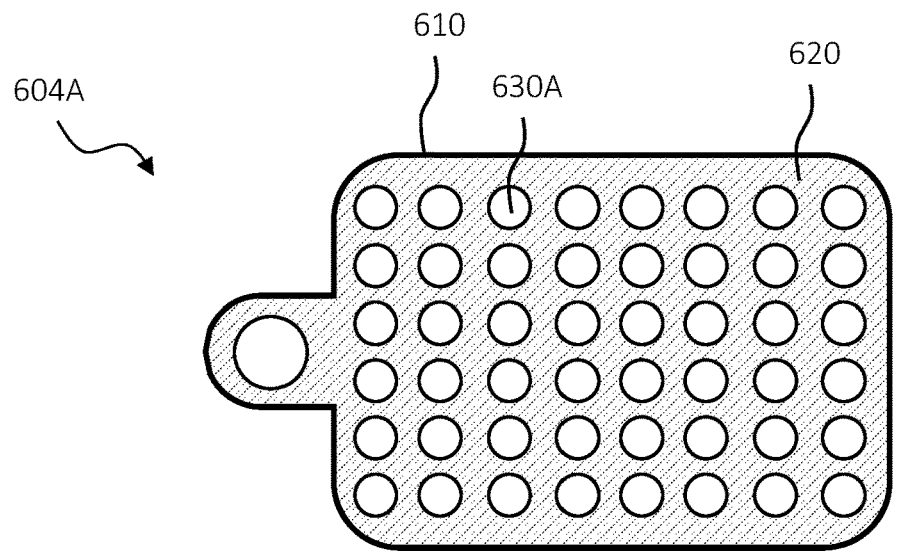
FIGS. 6A through 6E illustrate cross-sectional views of a variety of different floats (e.g., paddled shaped floats) designed, manufactured, and operated according to one or more embodiments of the disclosure, as might be used with the fluid flow control device of FIG. 5.

With initial reference to FIG. 6A, illustrated is one embodiment of a float 604A designed, manufactured, and operated according to one or more embodiments of the disclosure. The float 604A includes a fluid impermeable exterior 610. The float 604A additionally includes a base material 620 having one or more cavities 630A positioned within the fluid impermeable exterior 610. As discussed above, in at least one embodiment, the base material 620 and optionally the fluid impermeable exterior 610, are formed using an additive manufacturing process. In the illustrated embodiment, the base material 620 includes a plurality of separate cavities 630A. For example, in the embodiment of FIG. 6A, the plurality of separate cavities 630A are a plurality of spherical cavities. Furthermore, the plurality of separate cavities 630A of the embodiment of FIG. 6A are substantially similarly shaped and/or similarly sized, if not entirely similar shaped or similarly sized, cavities 630A. The plurality of separate cavities 630A, in the illustrated embodiment, may additionally be substantially equally spaced cavities, and are optionally substantially equally distributed cavities.

Further to the embodiment of FIG. 6A, the base material 620 comprises a first material and the fluid impermeable exterior 610 comprises a second material. The first material and the second material may be the same material, as is illustrated in FIG. 6A. In an alternative embodiment, the first material and the second material are different materials.

Figure 6B:
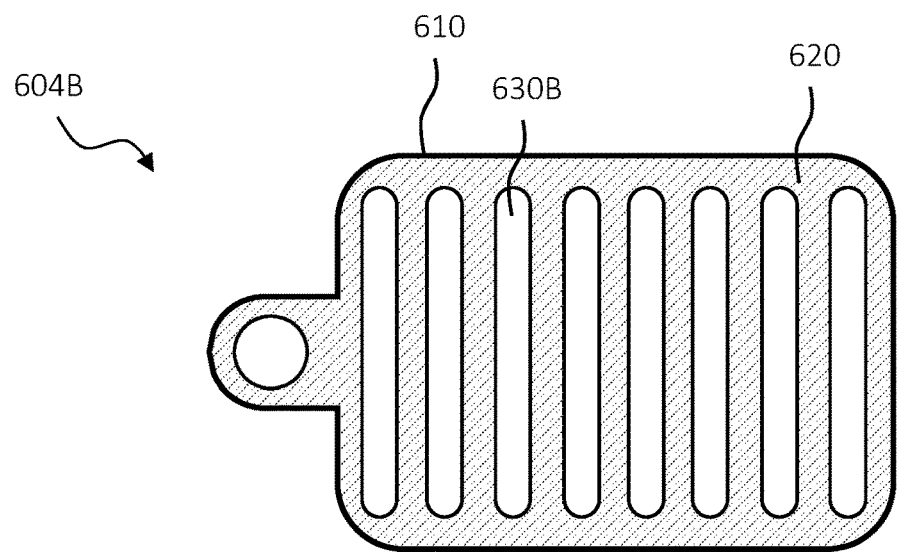

Turning now to FIG. 6B, illustrated is an alternative embodiment of a float 604B designed, manufactured, and operated according to another embodiment of the disclosure. The float 604B is similar in many respects to the float 604A of FIG. 6A. Accordingly, like reference numbers have been used to indicate similar, if not identical, features. The float 604B differs, for the most part, from the float 604A in that the float 604B employs multiple longitudinal shaped cavities 630B. The multiple longitudinal shaped cavities 630B, in the embodiment of FIG. 6B, are substantially equally spaced, and substantially equally distributed.

Figure 6C:
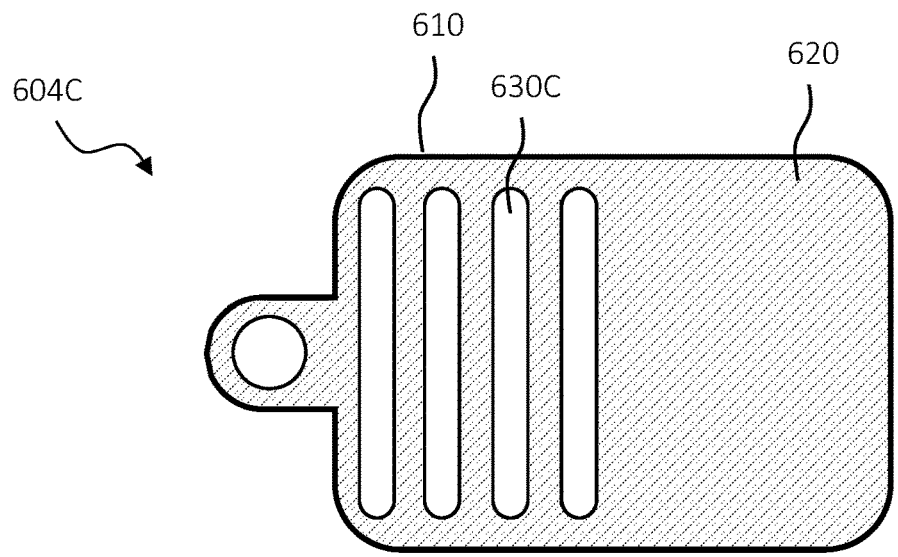

Turning now to FIG. 6C, illustrated is an alternative embodiment of a float 604C designed, manufactured, and operated according to another embodiment of the disclosure. The float 604C is similar in many respects to the float 604B of FIG. 6B. Accordingly, like reference numbers have been used to indicate similar, if not identical, features. The float 604C differs, for the most part, from the float 604B in that the float 604C employs multiple longitudinal shaped cavities 630C that are equally spaced, but are concentrated together to alter the center of gravity of the float 604C. For example, wherein a center of gravity of the float 604B would be substantially at a midpoint of a width and height of the float 604B, the center of gravity of the float 604C would be to the left of the midpoint of the width of the float 604C.

Figure 6D:
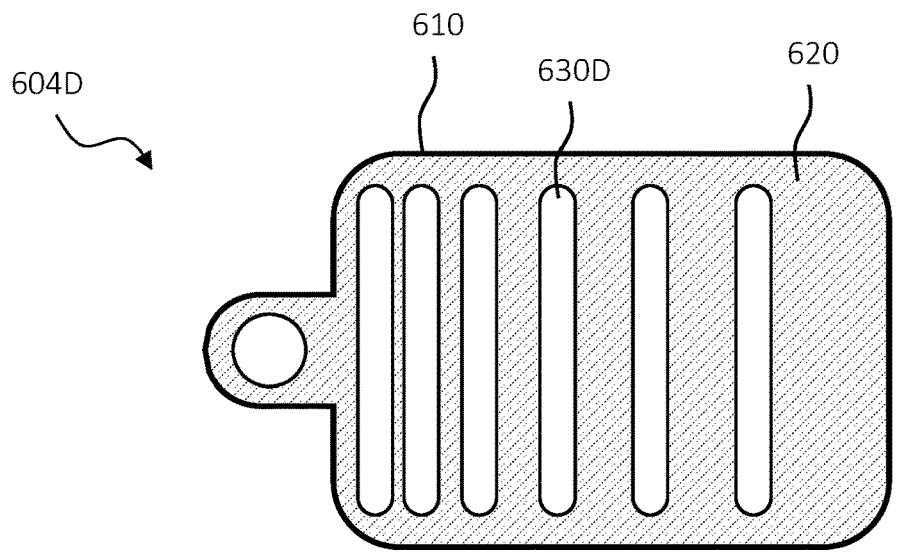

Turning now to FIG. 6D, illustrated is an alternative embodiment of a float 604D designed, manufactured, and operated according to another embodiment of the disclosure. The float 604D is similar in many respects to the float 604C of FIG. 6C. Accordingly, like reference numbers have been used to indicate similar, if not identical, features. The float 604D differs, for the most part, from the float 604C, in that the float 604D employs multiple longitudinal shaped cavities 630C that are gradiently spaced. Again, the gradient spacing may be used to change the location of the center of gravity of the float 604D.

Figure 6E:
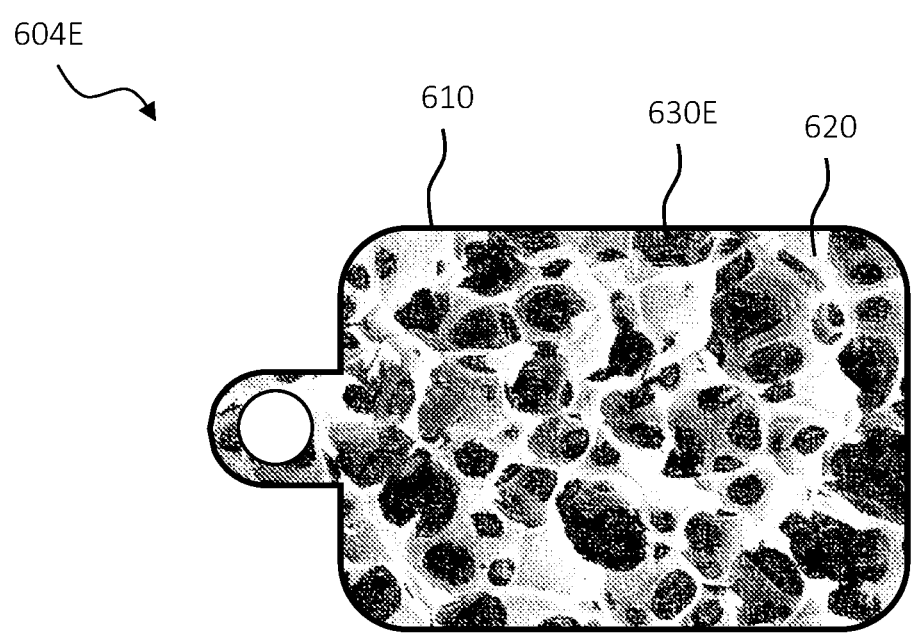

Turning now to FIG. 6E, illustrated is an alternative embodiment of a float 604E designed, manufactured, and operated according to another embodiment of the disclosure. The float 604E is similar in many respects to the float 604A of FIG. 6A. Accordingly, like reference numbers have been used to indicate similar, if not identical, features. The float 604E differs, for the most part, from the float 604A, in that the float 604E employs a foam structure 620 for its base material.

Turning to FIG. 7, illustrated is a cross-sectional view of an alternative embodiment of a fluid flow control device 700 designed, manufactured, and operated according to one or more embodiments of the disclosure. The fluid flow control device 700 is similar in many respects to the fluid flow control device 300 of FIG. 3. Accordingly, like reference numbers have been used to indicate similar, if not identical, features. The fluid flow control device 700 differs, for the most part, from the fluid flow control device 300, in that the fluid flow control device 700 does not employ the rotatable component 308. Alternatively, the fluid flow control device 700 employs a single spherical shaped float 704. The single spherical shaped float 704, in at least the illustrated embodiment, is operable to float upward to close the fluid outlet 307 when its density is less than the fluid density of a desirable fluid, or sink downward to open the fluid outlet 307 when its density is greater than the fluid density of the desirable fluid. It should be apparent that the fluid flow control device 700 could be reversed so that the sphere 704 restricts the fluid outlet 307 when its density is greater than the fluid density of a desired fluid.

Figure 8:
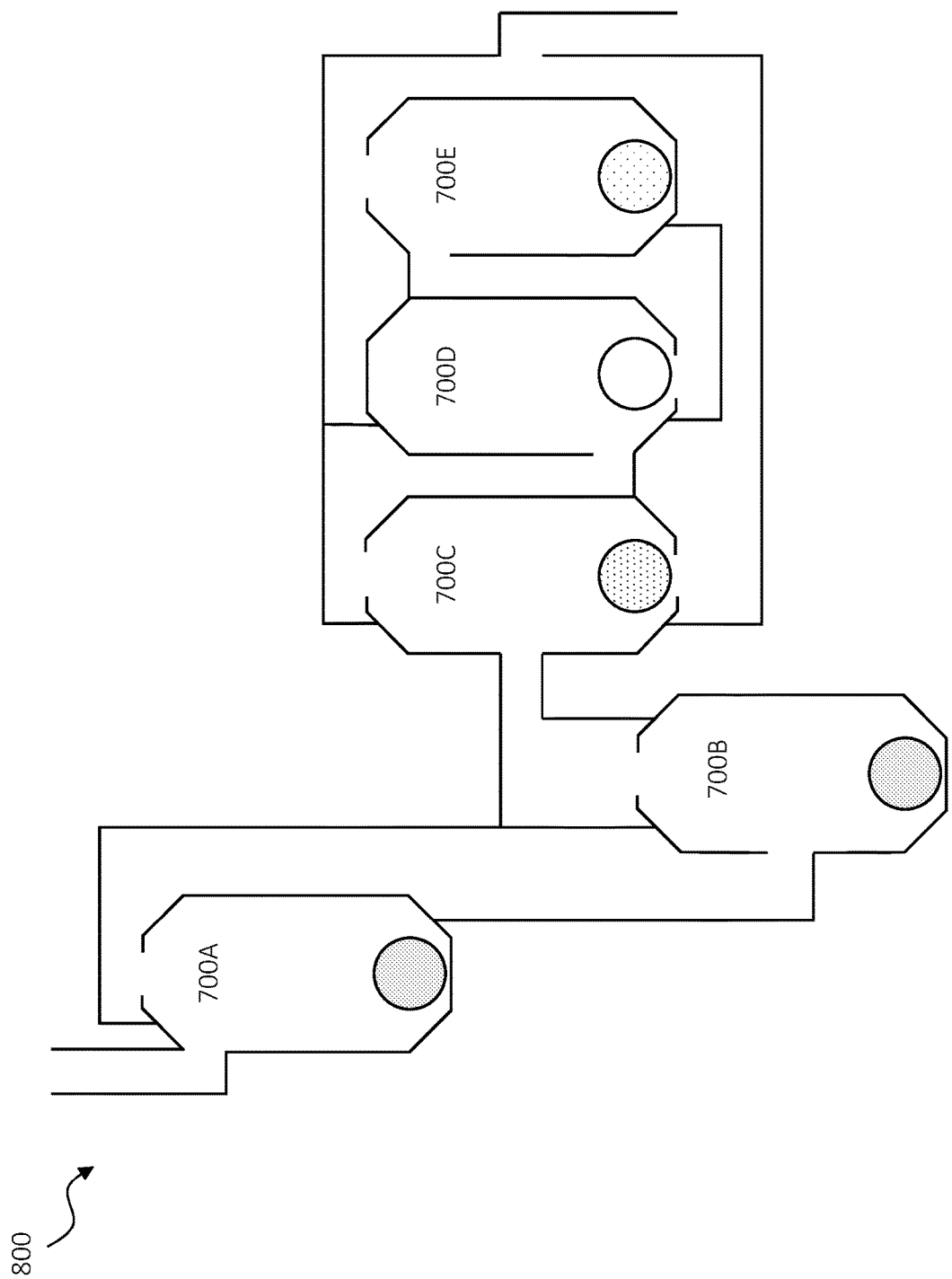
FIG. 8 illustrates an orientation dependent inflow control apparatus designed, manufactured, and operated according to one or more embodiments of the disclosure.

FIG. 8 illustrates an orientation dependent inflow control apparatus 800 designed, manufactured and operated according to one or more embodiments of the disclosure. In the embodiment of FIG. 8, multiple fluid flow control devices 700A-700E are stacked to assist with certain orientation issues that may exist when the fluid flow control device 700 is positioned on a tubular downhole. The multiple fluid flow control devices 700A-700E may also be used to discriminate fluid flow based upon more than just two different densities.

FIG. 9 illustrates a rolled-out view (360°) of a device 900 comprising four orientation dependent inflow control apparatuses 800A-800D equidistantly distributed around the perimeter outside of a basepipe (not shown). In FIG. 9 the reference indications x and x' are connected to one another, as well as the reference indications y and y' are connected to one another. Each of the four orientation dependent inflow control apparatuses 800A-800D is in fluid communication with a corresponding density control valve to form a density control valve system. The orientation of each of the four orientation dependent inflow control apparatuses 800A-800D is indicated by the g-vectors ($\vec{g}$) where the indication + is to be understood to be in a direction into the drawing, the downward arrow is in a direction vertically down, the ● is in a direction out of the drawing and the upward arrow is in a direction vertically up.

FIGS. 10A through 10E illustrate cross-sectional views of a variety of different floats (e.g., spherical shaped floats) 1004A-1004E designed, manufactured, and operated according to one or more embodiments of the disclosure, as might be used with the fluid flow control device 700 of FIG. 7. For example, each of the floats 1004A-1004E could be configured to float and/or sink back and forth between the open and closed positions.

Each of the different floats 1004A-1004E, or at least a portion of each of the different floats 1004A-1004E, has been formed using the aforementioned additive manufacturing process. Specifically, the additive manufacturing process has been employed to provide a float 1004A-1004E having a highly specific net density (e.g., combined density of all the associated parts of the float). In at least one embodiment, the additive manufacturing process has been employed to provide a net density that is above a first density of a desired fluid and below a second density of an undesired fluid. In at least one other embodiment, the native density of the base material and/or the fluid impermeable exterior is greater than the first density or the second density. For example, the native density of the base material and/or the fluid impermeable exterior may be 1.3 sg or greater.

Figure 10A:
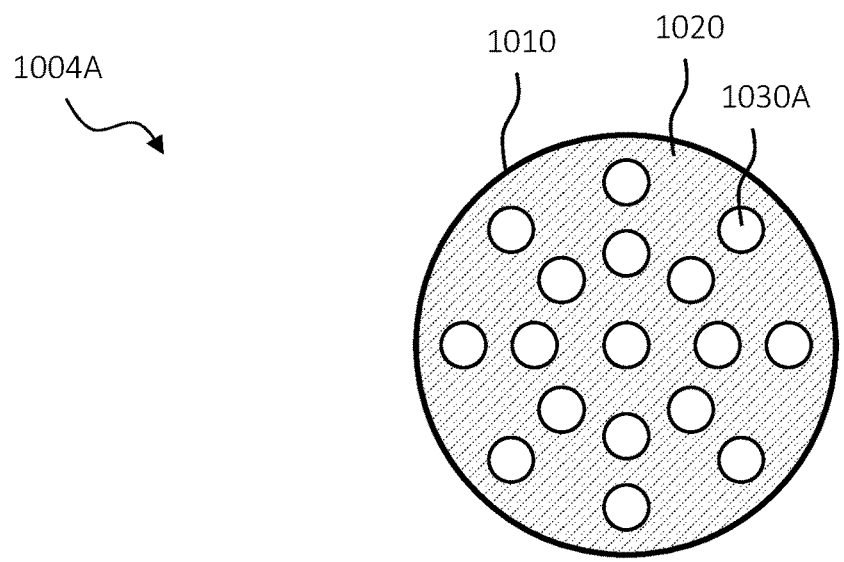

With initial reference to FIG. 10A, illustrated is one embodiment of a float 1004A designed, manufactured, and operated according to one or more embodiments of the disclosure. The float 1004A includes a fluid impermeable exterior 1010. The float 1004A additionally includes a base material 1020 having one or more cavities 1030A positioned within the fluid impermeable exterior 1010. As discussed above, in at least one embodiment, the base material 1020 and optionally the fluid impermeable exterior 1010, are formed using an additive manufacturing process. In the illustrated embodiment, the base material 1020 includes a plurality of separate cavities 1030A. For example, in the embodiment of FIG. 10A, the plurality of separate cavities 1030A are a plurality of spherical cavities. Furthermore, the plurality of separate cavities 1030A of the embodiment of FIG. 10A are substantially similarly shaped and/or similarly sized, if not entirely similar shaped or similarly sized, cavities 1030A. The plurality of separate cavities 1030A, in the illustrated embodiment, may additionally be substantially equally spaced cavities, and are optionally substantially equally distributed cavities.

Further to the embodiment of FIG. 10A, the base material 1020 comprises a first material and the fluid impermeable exterior 1010 comprises a second material. The first material and the second material may be the same material, as is illustrated in FIG. 10A. In an alternative embodiment, the first material and the second material are different materials.

Figure 10B:
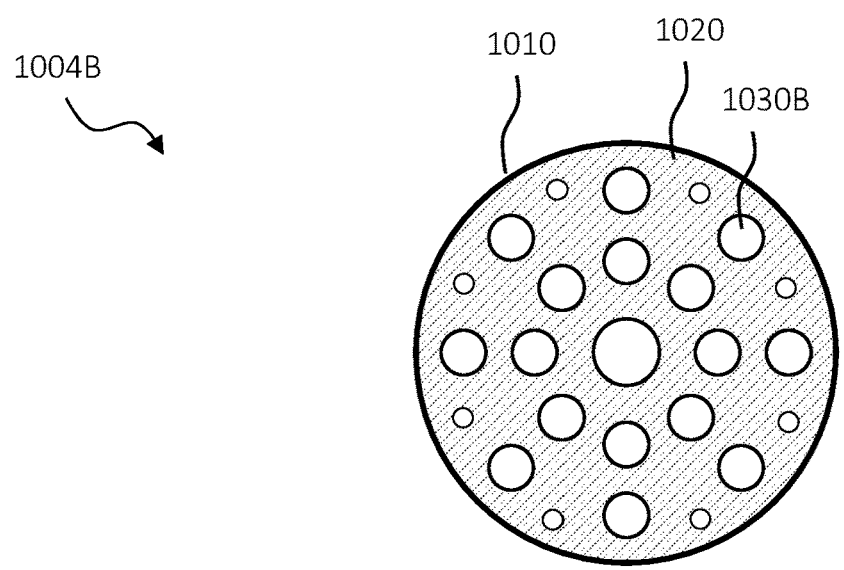

Turning now to FIG. 10B, illustrated is an alternative embodiment of a float 1004B designed, manufactured, and operated according to another embodiment of the disclosure. The float 1004B is similar in many respects to the float 1004A of FIG. 10A. Accordingly, like reference numbers have been used to indicate similar, if not identical, features. The float 1004B differs, for the most part, from the float 1004A in that the float 1004B employs two or more (e.g., three or more) different sizes of cavities 1030B.

Figure 10C:
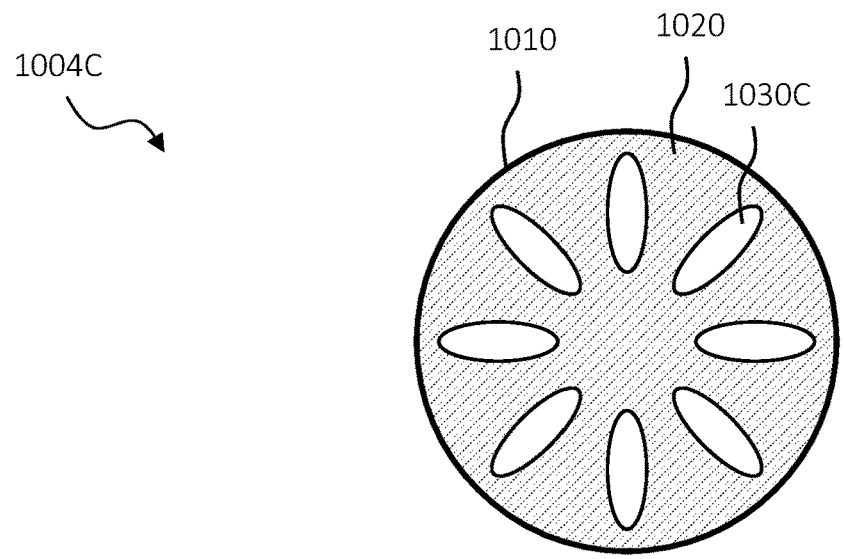

Turning now to FIG. 10C, illustrated is an alternative embodiment of a float 1004C designed, manufactured, and operated according to another embodiment of the disclosure. The float 1004C is similar in many respects to the float 1004A of FIG. 10A. Accordingly, like reference numbers have been used to indicate similar, if not identical, features. The float 1004C differs, for the most part, from the float 1004A in that the float 1004C employs multiple longitudinal shaped cavities 1030C. The multiple longitudinal shaped cavities 1030C, in the embodiment of FIG. 10B, are substantially equally spaced, and substantially equally radially distributed.

Figure 10D:
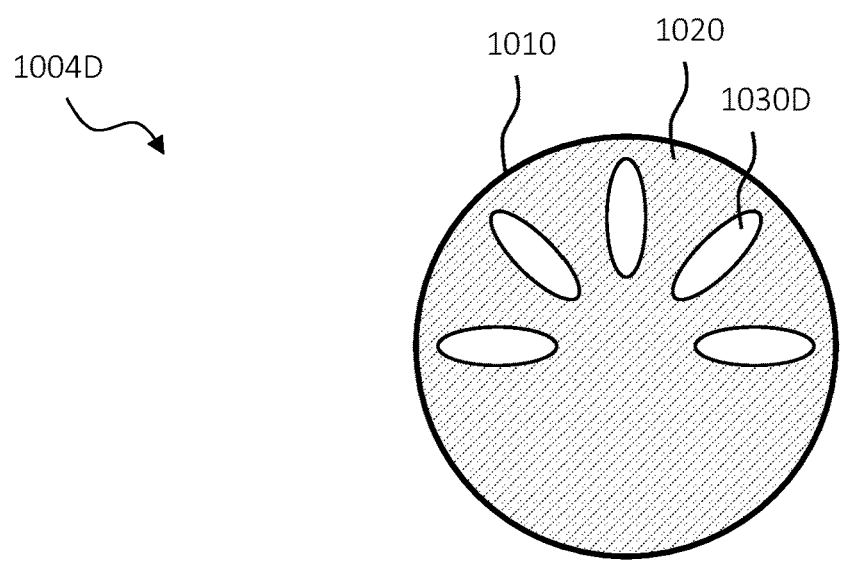

Turning now to FIG. 10D, illustrated is an alternative embodiment of a float 1004D designed, manufactured, and operated according to another embodiment of the disclosure. The float 1004D is similar in many respects to the float 1004C of FIG. 10C. Accordingly, like reference numbers have been used to indicate similar, if not identical, features. The float 1004D differs, for the most part, from the float 1004C in that the float 1004D employs multiple longitudinal shaped cavities 1030D that are equally spaced, but are concentrated together to alter the center of gravity of the float 1004D. For example, wherein a center of gravity of the float 1004C would be substantially at a midpoint of a width and height of the float 1004C (e.g., the midpoint of the sphere), the center of gravity of the float 1004D would be below the midpoint of the width and height of the float 1004D (e.g., below the midpoint of the sphere).

Figure 10E:
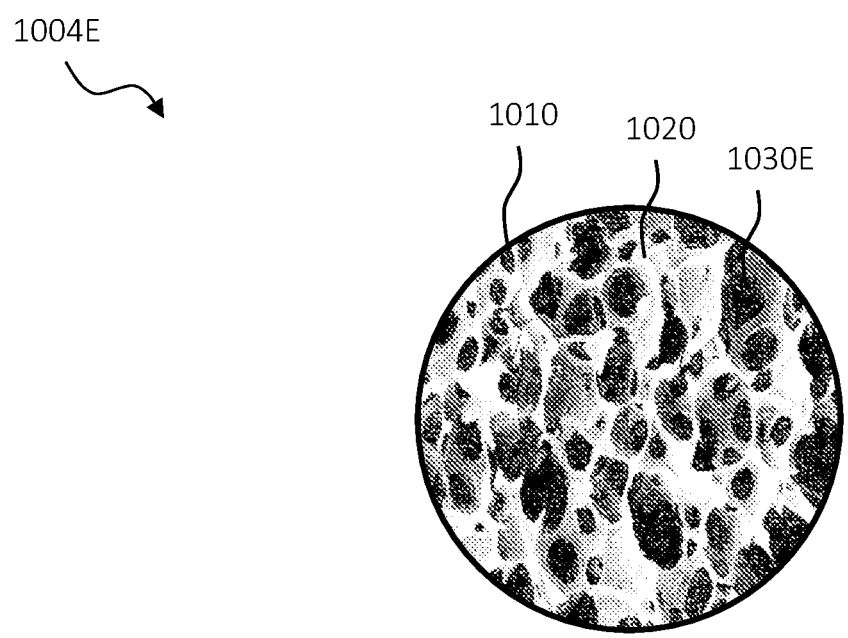

Turning now to FIG. 10E, illustrated is an alternative embodiment of a float 1004E designed, manufactured, and operated according to another embodiment of the disclosure. The float 1004E is similar in many respects to the float 1004A of FIG. 10A. Accordingly, like reference numbers have been used to indicate similar, if not identical, features. The float 1004E differs, for the most part, from the float 1004A, in that the float 1004E employs a foam structure 1020 for its base material.

Aspects disclosed herein include:

A. A float for use with a fluid flow control device, the float including: 1) a fluid impermeable exterior; and 2) a base material having one or more cavities positioned within the fluid impermeable exterior, the base material formed using an additive manufacturing process.

B. A fluid flow control device, the fluid flow control device including: 1) an inlet port; 2) an outlet port; 3) a float positioned between the inlet port and the outlet port, the float movable between an open position that allows fluid flow through the outlet port and a closed position that restricts fluid flow through the outlet port, the float including: a) a fluid impermeable exterior; and b) a base material having one or more cavities positioned within the fluid impermeable exterior, the base material formed using an additive manufacturing process.

C. A method for manufacturing a fluid flow control device, the method including: 1) forming at least a portion of a float using an additive manufacturing process, the float including: a) a fluid impermeable exterior; and b) a base material having one or more cavities positioned within the fluid impermeable exterior; and 2) positioning the float between an inlet port and an outlet port, the float movable between an open position that allows fluid flow through the outlet port and a closed position that restricts fluid flow through the outlet port.

D. A well system, the well system including: 1) a wellbore forming through a subterranean formation; 2) a tubing string positioned within the wellbore; 3) a fluid flow control device coupled to the tubing string, the fluid flow control device including: a) an inlet port operable to receive fluid from the subterranean formation; b) an outlet port operable to pass the fluid to the tubing string; and c) a float positioned between the inlet port and the outlet port, the float movable between an open position that allows fluid flow through the outlet port to the tubing string and a closed position that restricts fluid flow through the outlet port to the tubing string, the float including: i) a fluid impermeable exterior; and ii) a base material having one or more cavities positioned within the fluid impermeable exterior, the base material formed using an additive manufacturing process.

Aspects A, B, C, and D may have one or more of the following additional elements in combination: Element 1: wherein the fluid impermeable member and the base material having the one or more cavities have a net density that is above a first density of a desired fluid and below a second density of an undesired fluid. Element 2: wherein the base material comprises a first material and the fluid impermeable exterior comprises a second material. Element 3: wherein the first material and the second material are different materials. Element 4: wherein the first material and the second material are a same material. Element 5: wherein the base material having one or more cavities is a foam material formed using the additive manufacturing process. Element 6: wherein the fluid impermeable exterior forms a spherical shaped float. Element 7: wherein the fluid impermeable exterior forms a paddle shaped float. Element 8: wherein the base material has four or more substantially equally spaced cavities positioned within the fluid impermeable exterior. Element 9: wherein the base material has four or more gradiently spaced cavities positioned within the fluid impermeable exterior to alter a center of gravity of the float. Element 10: wherein the base material has four or more substantially equally sized cavities positioned within the fluid impermeable exterior. Element 11: wherein the fluid impermeable exterior forms a hermetic seal around the base material having the one or more cavities. Element 12: wherein forming at least a portion of a float using an additive manufacturing process includes tailoring a net density of the fluid impermeable exterior and the base material above a first density of a desired fluid and below a second density of an undesired fluid.

Those skilled in the art to which this application relates will appreciate that other and further additions, deletions, substitutions, and modifications may be made to the described embodiments.

What is claimed is:

1. A float for use with a fluid flow control device, comprising:
   a fluid impermeable exterior;
   a base material having one or more cavities positioned within the fluid impermeable exterior, the base material formed using an additive manufacturing process; and
   a hinge point coupled to the fluid impermeable exterior and the base material, the hinge point configured to allow the float to rotate thereabout.

2. The float as recited in claim 1, wherein the fluid impermeable exterior and the base material having the one or more cavities have a net density that is above a first density of a desired fluid and below a second density of an undesired fluid.

3. The float as recited in claim 1, wherein the base material comprises a first material and the fluid impermeable exterior comprises a second material.

4. The float as recited in claim 3, wherein the first material and the second material are different materials.

5. The float as recited in claim 3, wherein the first material and the second material are a same material.

6. The float as recited in claim 1, wherein the base material having one or more cavities is a foam material formed using the additive manufacturing process.

7. The float as recited in claim 1, wherein the fluid impermeable exterior forms a paddle shaped float.

8. The float as recited in claim 1, wherein the base material has four or more substantially equally spaced cavities positioned within the fluid impermeable exterior.

9. The float as recited in claim 1, wherein the base material has four or more gradiently spaced cavities positioned within the fluid impermeable exterior to alter a center of gravity of the float.

10. The float as recited in claim 1, wherein the base material has four or more substantially equally sized cavities positioned within the fluid impermeable exterior.

11. The float as recited in claim 1, wherein the fluid impermeable exterior forms a hermetic seal around the base material having the one or more cavities.

12. A fluid flow control device, comprising:
    an inlet port;
    an outlet port;
    a float positioned between the inlet port and the outlet port, the float movable between an open position that allows fluid flow through the outlet port and a closed position that restricts fluid flow through the outlet port, the float including:
    a fluid impermeable exterior;
    a base material having one or more cavities positioned within the fluid impermeable exterior, the base material formed using an additive manufacturing process; and
    a hinge point coupled to the fluid impermeable exterior and the base material, the hinge point configured to allow the float to rotate thereabout.

13. The fluid flow control device as recited in claim 12, wherein the fluid impermeable exterior and the base material having the one or more cavities have a net density that is above a first density of a desired fluid and is below a second density of an undesired fluid.

14. The fluid flow control device as recited in claim 12, wherein the base material having one or more cavities is a foam material formed using the additive manufacturing process.

15. The fluid flow control device as recited in claim 12, wherein the fluid impermeable exterior forms a paddle shaped float.

16. The fluid flow control device as recited in claim 12, wherein the base material has four or more substantially equally sized cavities positioned within the fluid impermeable exterior.

17. The fluid flow control device as recited in claim 12, wherein the fluid impermeable exterior forms a hermetic seal around the base material having the one or more cavities.

18. A method for manufacturing a fluid flow control device, comprising:
    forming at least a portion of a float using an additive manufacturing process, the float including:
    a fluid impermeable exterior;
    a base material having one or more cavities positioned within the fluid impermeable exterior; and
    a hinge point coupled to the fluid impermeable exterior and the base material, the hinge point configured to allow the float to rotate thereabout; and
    positioning the float between an inlet port and an outlet port, the float movable between an open position that allows fluid flow through the outlet port and a closed position that restricts fluid flow through the outlet port.

19. The method as recited in claim 18, wherein forming at least a portion of a float using an additive manufacturing process includes tailoring a net density of the fluid impermeable exterior and the base material above a first density of a desired fluid and below a second density of an undesired fluid.

20. A well system, comprising:
a wellbore formed through a subterranean formation;
a tubing string positioned within the wellbore;
a fluid flow control device coupled to the tubing string, the fluid flow control device including:
  an inlet port operable to receive fluid from the subterranean formation;
  an outlet port operable to pass the fluid to the tubing string; and
  a float positioned between the inlet port and the outlet port, the float movable between an open position that allows fluid flow through the outlet port to the tubing string and a closed position that restricts fluid flow through the outlet port to the tubing string, the float including:
    a fluid impermeable exterior;
    a base material having one or more cavities positioned within the fluid impermeable exterior, the base material formed using an additive manufacturing process; and
    a hinge point coupled to the fluid impermeable exterior and the base material, the hinge point configured to allow the float to rotate thereabout.

* * * * *